April 23, 1946.   O. KYLIN   2,399,045
LATHE SCREW ATTACHMENT
Filed June 3, 1941   3 Sheets-Sheet 1

INVENTOR:
OSKAR KYLIN
BY Haugood & Van Horn
HIS ATTORNEYS

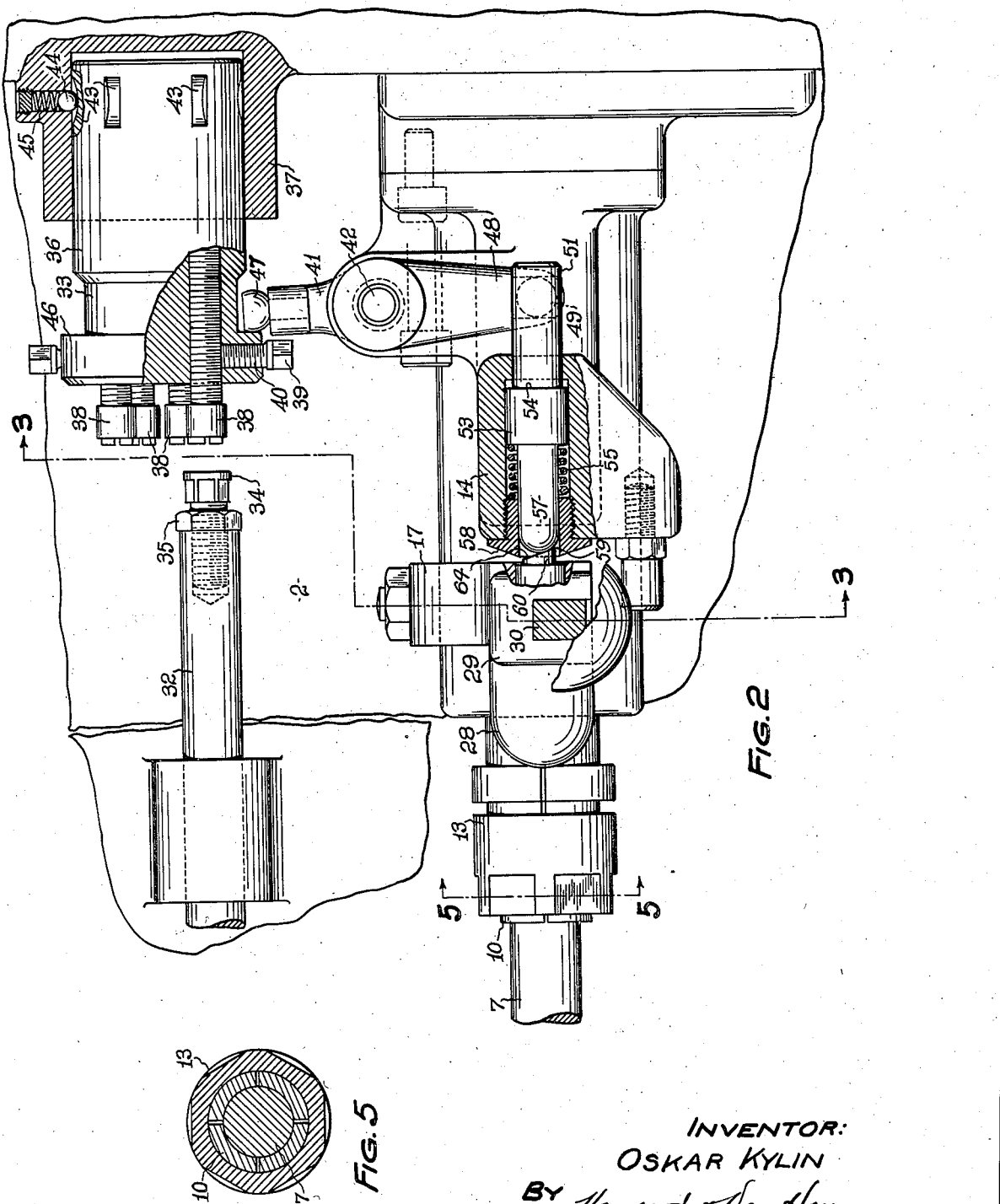

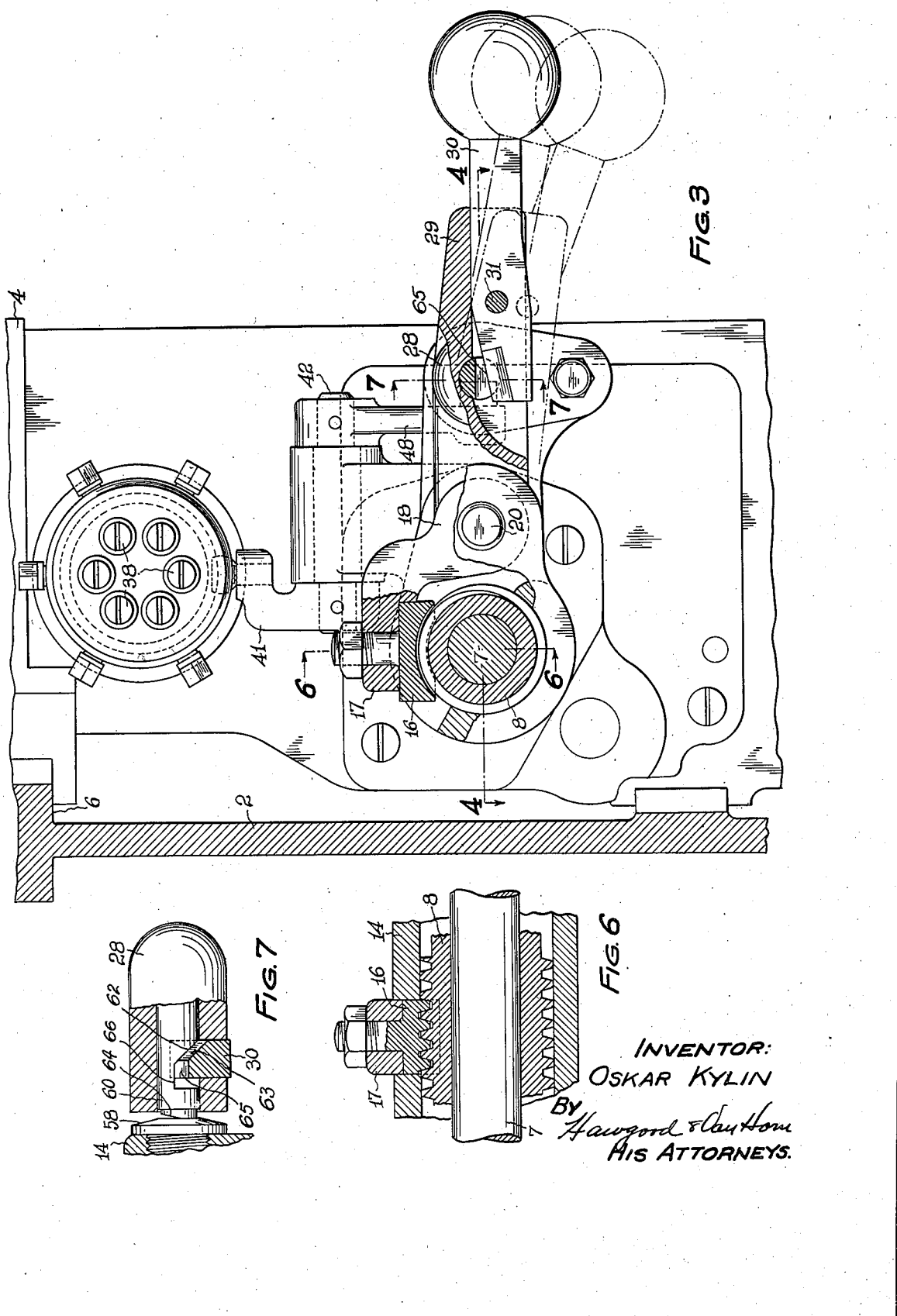

Patented Apr. 23, 1946

2,399,045

UNITED STATES PATENT OFFICE 2,399,045

LATHE SCREW ATTACHMENT

Oskar Kylin, Cleveland, Ohio, assignor to Bardons and Oliver, Inc., Cleveland, Ohio, a corporation of Ohio Application June 3, 1941, Serial No. 396,422

1 Claim. (Cl. 82—21)

This invention relates to screw cutting attachments for turret lathes and more particularly to an automatic stop mechanism for disengaging the tool feeding carriage and cross slide at a predetermined limit of travel of the carriage.

One of the objects of the present invention is to provide a machine tool attachment of the above named character which is positive in action to stop the tool feed when a preselected limit of tool travel has been reached.

Another object is to provide a relatively simple mechanism for the purposes specified in which the driving connection with the lead screw is manually engaged but which may be automatically or manually disengaged.

A further object of the invention is to provide a kick out mechanism operable to stop the travel of the tool carriage along the lead screw instantly the tool reaches a predetermined limit of movement along the work piece, said mechanism including means whereby the feed of the tool may be terminated manually at any point along its path of travel.

Another object of the invention is the provision of a mechanism of the above named character which is compact and readily adaptable to the tool carriage assembly.

Other objects and advantages of my invention will become more apparent as the following description of one embodiment thereof progresses, reference being made to the accompanying drawings in which like reference characters are employed to designate like parts throughout the same.

In the drawings:

Figure 2 is a front elevation of the same shown partly in section and in slightly larger scale;

Figure 3 is a section taken on line 3—3 of Figure 2 in the direction of the arrows and illustrates the principal positions of the control lever;

Figure 5 is a section taken on line 5—5 of Figure 2;

Figure 6 is a section taken on line 6—6 of Figure 3; and

Figure 7 is a partial section taken on line 7—7 of Figure 3.

Figure 1:
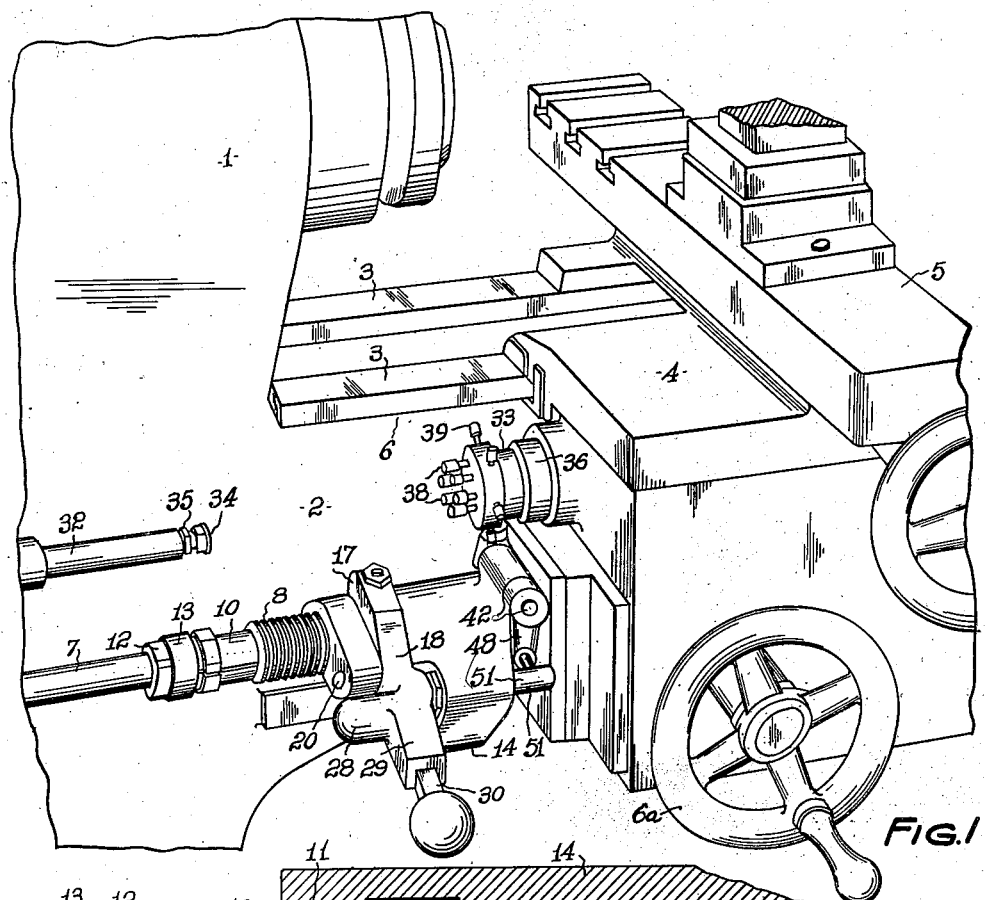
Figure 1 is a perspective view of an embodiment of my invention shown as applied to a turret lathe.

Referring now to the drawings more in detail, the embodiment of the invention illustrated may be described as follows as used on a turret lathe or other machine tool.

The head stock of the lathe is shown at 1 on the lathe bed 2, there being the usual ways 3 along which the tool carriage 4 travels. The carriage is provided with a cross slide 5 for transverse tool travel and suitable driving connection with a rack 6 for longitudinal travel of the carriage along the bed when the hand wheel 6a is operated.

For threading or similar operations, the usual feed shaft 7 is provided and is driven through a suitably arranged driving connection with a source of power. A hollow lead screw 8 is removably mounted on the shaft 7 and is splined at one end to the shaft as at 9.

Figure 4:
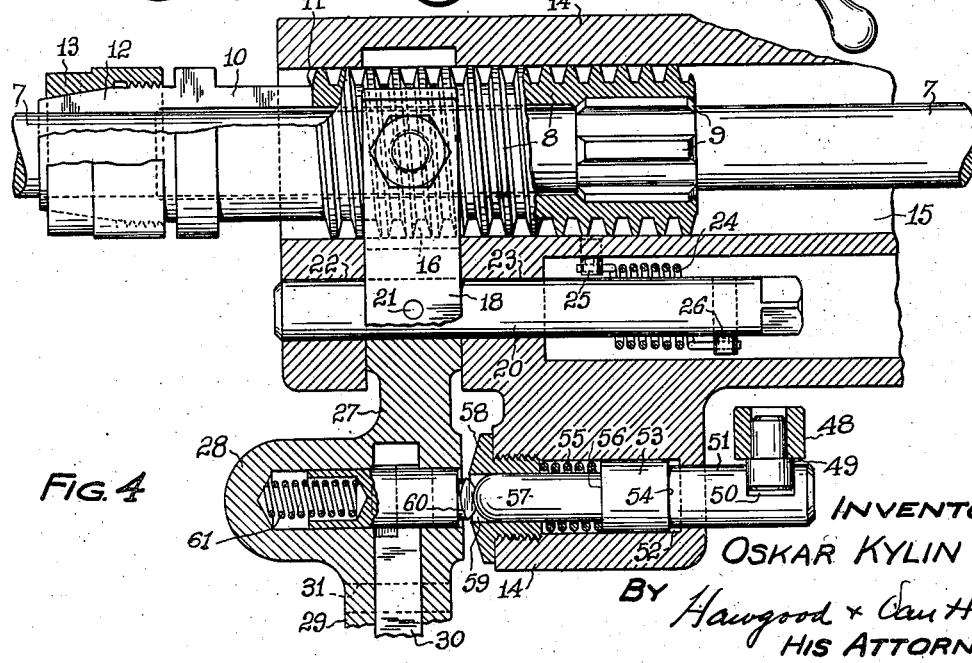
Figure 4 is a section taken on line 4—4 of Figure 3.

A collet 10 is carried on the other end of the lead screw at 11 and when the lead screw is in place as shown in Figure 4, the resilient fingers 12 of the collet are forced radially inwardly to grip the shaft 7 firmly by means of an internally tapered clamping nut 13 threaded on the tapered fingers 12 to thereby prevent axial displacement of the hollow lead screw on the shaft.

The lead screw 8 with its collet assembly is interchangeable with similar units on the shaft 7 for varying the rate of longitudinal feed of the tool, by simply loosening the clamping nut 13 and releasing the gripping action of the fingers on the shaft 7.

As will be seen from the drawings, the tool carriage 4 operates along the lead screw 8 and is provided with a casing 14 having a channel 15 through which the lead screw passes as the carriage travels from left to right or vice versa.

Automatic feeding movement of the carriage along the lathe bed is effected by engagement of an internally threaded nut segment 16 with the threads on the lead screw 8 when the lead screw is rotating. The nut segment 16 is removably carried on one end 17 of a lever 18 fulcrumed at 19 on an axis defined by the rod or shaft 20. A pin 21 locks the lever and rod together for rocking movement in the bearing portions 22 and 23 of the casing 14 against the action of a coiled spring 24 telescoping the rod 20 and secured at its other end to a radially extending post 26 carried by the rod 20. The spring is set to normally rock the lever 18 to disengage the nut segment from the lead screw as illustrated in broken lines in Figure 3. The opposite end of the lever 18 extends outwardly as at 27 and comprises a latch housing 28 as well as a supporting portion 29 for the handle 30 pivotally carried thereby at 31.

Under certain conditions, which will be described more fully hereinafter, the handle 30 may be operated about its fulcrum 31 independently of the lever 18 for manual control of the nut segment 16.

In further carrying out my invention, I provide an adjustably fixed stop 32, carried by a suitable part on the lathe bed or head stock, and projecting longitudinally along the bed for engagement with another stop 33 supported on the carriage 4. The outer end of the fixed stop 32 comprises an abutment 34 which may be longitudinally adjusted in the member 32 and locked in adjusted position by means of the lock nut 35.

Referring now more particularly to Figure 2, it will be seen that the stop 33 comprises a rotatable member 36 slidable axially in the casing 37 carried by the carriage 4. A plurality of axially adjustable stops 38 are threaded into the member 36 and each one may be individually locked in a selected axial adjustment by means of the locking bolts 39 threaded radially into the member 36 at 40 to engage the individual stops 38. By rotating the member 36 in either direction in the casing 37, any one of the selected stops 38 may be brought into a position where it will engage the abutment 34 when the carriage travels to the left in Figure 2. Engagement of the selected stop 38 with the fixed stop 34 as the carriage continues to travel to the left will impart a sliding movement to the member 36 in its casing to the right to actuate a crank 41 keyed to a shaft rockable at 42 in the casing 14.

The stop selector head 36 is manually rotatable in the casing 37, and is provided at 43 with an equally spaced series of guiding recesses or grooves each of which is in axial alignment with one of the adjustable stops 38. A spring pressed ball 44 is urged radially inwardly of the casing 37 to releasably engage one of the grooves 43 as the selected stop 38 is brought into alignment with the stop 34. It will be seen that these grooves are longitudinally arranged in the selector head and that their bottom walls are arcuate in shape to permit easy sliding movement of the head in a guided longitudinal direction and at the same time to permit manual rotation of the head 36 with a turning effort sufficient to unseat the ball 44 from the groove against the compression of the spring 45.

The head 33 terminates at its free end in an outwardly projecting annular wall 46 which is engageable with a head 47 carried by the crank arm 41. Another crank arm 48 is keyed to rock with the shaft 42 and is provided with a headed pin 49 extending outwardly of the crank for operating engagement in the slotted end 50 of the plunger 51. The plunger 51 is slidable within the bore 52 in the casing 14 and is provided with an enlarged bearing section 53, the end wall 54 providing a stop against the end of the bore to limit movement of the plunger to the right. A compression spring 55 abuts the opposite end wall 56 of the bearing portion 53 and surrounds the forward part 57 of the plunger. A retaining nut 58 is threaded into the forward end of the bore 52 and abuts the opposite end of the spring 55.

A central opening 59 is provided in the nut 58 to permit sliding movement of the forward portion of the plunger 57 therewithin and also to receive the end of the latch or bolt 60.

The latch 60 is slidable in the casing 28 and is normally urged outwardly to the right in Figure 4 by the coiled compression spring 61, one end of which is carried within the hollowed end of the latch 60 while its other end abuts the inner end wall of the casing 28.

Referring more particularly to Figures 4 and 7, it will be seen that the latch member 60 is notched or kerfed to provide an inclined wall 62 having sliding engagement with a similarly inclined wall 63 formed on the lever 30. As the lever 30 is depressed from the full line position in Figure 3 on its axis to the intermediate or first broken line position the inclined surfaces will slide over one another and cause the latch 60 to be retracted to the left in Figure 4 or to the right in Figure 7 against the compression of the spring 61 until the bevelled end 64 of the latch is withdrawn from within the opening 59 in the nut 58.

When the lever 30 is depressed still further toward its lowermost position indicated in broken lines in Figure 3, the upper surface 65 of the lever end will engage the surface 66 of the notch and cause the entire lever assembly including the portion 18 to move about the pivot 20 in a clockwise direction. In this manner the nut segment 16 may be manually disengaged from the lead screw 8.

When the latch is projected into the opening in the nut 58 under the compression of spring 61, its inclined wall 64 will engage the end of the plunger 57, the pointed end of the latch acting as a stop against the walls of the opening 59, thus preventing the lever 18 from movement about its fulcrum as urged by the spring 24 to disengage the nut segment 16 from the lead screw 8.

Various changes may be made in the details of construction of the invention without departing from the spirit of the same or the scope of the appended claim.

I claim:

In a machine tool, a rotary lead screw, a traversing carriage, a nut segment carried by the carriage and movable into and out of engagement with the lead screw, spring urged means rockable on the carriage to normally disengage the nut segment and the lead screw, a latch on the rockable means and engageable with a stop actuated mechanism on the carriage to retain said means in nut engaging position, a stop actuated mechanism on the carriage and operable to release said latch and to thereby release the spring urged rockable member and nut segment from engagement with the lead screw upon a predetermined movement of the carriage, and a lever pivoted on said rockable member and operable to release the latch from its engagement with the stop actuated mechanism independently of the actuation of the stop mechanism.

OSKAR KYLIN.